J. F. ARNETH.
ANIMAL TRAP.
APPLICATION FILED MAR. 22, 1921.
1,387,826.
Patented Aug. 16, 1921.
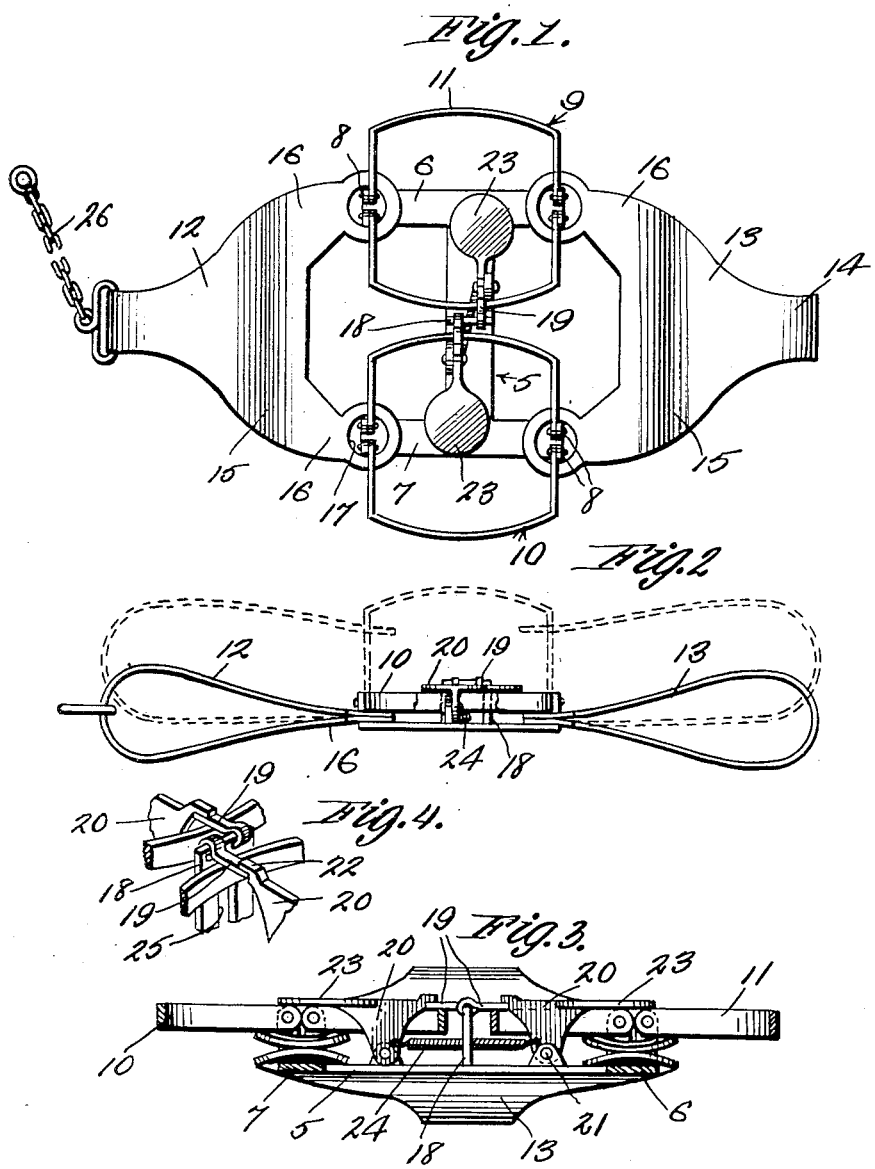
WITNESSES
JOHN F. ARNETH
INVENTOR.
BY
ATTORNEY.

UNITED STATES PATENT OFFICE.

JOHN F. ARNETH, OF WASHINGTON, DISTRICT OF COLUMBIA.

ANIMAL-TRAP.

1,387,826.

Specification of Letters Patent.   Patented Aug. 16, 1921.

Application filed March 22, 1921. Serial No. 454,592.

*To all whom it may concern:*

Be it known that I, JOHN F. ARNETH, citizen of the United States, residing at city of Washington, in the District of Columbia, have invented certain new and useful Improvements in Animal-Traps, of which the following is a specification.

This invention relates to new and useful improvements in traps and more particularly to that type known as steel traps, this application being a continuation in part of my U. S. application Serial Number 313,303 filed July 25, 1919.

An important object of the invention is to provide a trap embodying a plurality of pairs of jaws, which pairs of jaws are adapted to close one after the other in quick succession.

Another important object of the invention is to provide a trap of the above nature, the arrangement of the pairs of jaws being such that each pair of jaws is arranged beyond the confines of all other pairs of jaws.

A further object of the invention is to provide a trap of the above character which is of a simple construction strong and durable, and is efficient in operation and inexpensive to manufacture.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings forming a part of the application and wherein like numerals are employed to designate like parts throughout the several views, Figure 1 is a top plan of the invention.

Fig. 2 is a side elevation of the same.

Fig. 3 is a section through the same.

Fig. 4 is a perspective view of a portion of the invention.

Referring to the drawing wherein for the purpose of illustration is shown the preferred embodiment of my invention, the numeral 5 designates the base plate, which in the present instance assumes the form of a double T shaped plate, the heads 6 and 7 of which carry at their free ends pairs of transversely alined upstanding apertured lugs 8 which form bearings for two pairs of jaws 9 and 10. Although I have only illustrated two pairs of jaws in the present case, nevertheless it is to be understood that as many pairs of jaws may be used as may be found desirable. The jaws of each pair are exactly alike, and each comprises a U-shaped member, the free ends of the legs of which are pivotally mounted on the lugs 8, and their cross bars 11 are preferably bowed outwardly as clearly seen in Fig. 1. By this arrangement of jaws, it will be obvious that each pair of jaws is arranged beyond the confines of its coacting pair of jaws so that one pair of jaws will trap the animal in case the coacting pair of jaws fails.

Two heavy steel plate springs 12 and 13 which are exactly alike are associated with the trap in a manner to cause the pairs of jaws to close when the trap is sprung. Each spring is constructed of a shank portion 14 doubled midway its ends, each end of the shank portion terminating in a flat head 15 which is provided with a pair of diverging arms 16 provided at their terminals with apertures 17. The two heads 15 of each spring are arranged directly opposite each other so that the apertures in the arms 16 aline to permit passage therethrough of the legs of the jaws 9 and 10. In some instances, the spring 13 may be dispensed with leaving the spring 12 to perform the function of closing both pairs of jaws.

A post or standard 18 is secured to the mid portion of the base 5 so that it rises between the two pairs of jaws as clearly seen in Figs. 1 and 3. Adjacent the upper edge of this standard, a pair of apertures are provided therein to receive the looped inner ends of a pair of latches 19, which extend from opposite sides of the standard. It will be noted that a latch is provided for each pair of jaws and is adapted to overlap the bridge portion 11 of the inner jaw of its respective pair of jaws when the trap is in a set position. As will be understood, these latches due to their connection with the standard, have a pivotal mounting and are free to swing.

In order to retain the latches in position overlapping one jaw of each pair, a trigger 20 is provided for each latch. Each trigger has a depending portion pivotally connected as at 21 to the base 5 and is arranged within the confines of its respective pair of jaws when the latter are in a set position. Each trigger has its forward end provided with a nose 22 which is adapted to overlap its respective latch 19 for retaining the latter in a set position. The opposite end of each trigger is provided with a platform 23 upon which the lure may be fastened.

Means are provided for connecting the two triggers and for causing successive closing of the various pairs of jaws, and consists of a coiled spring 24 which extends through a slot 25 provided in the standard 18. One end of the coiled spring is connected to the depending portion of one trigger 20 while the opposite end of the spring is connected to the other trigger.

In order to set the trap, the arms 16 of the two springs 12 and 13 are depressed sufficiently to permit the jaws 10 and 11 opening. After having retained the jaws in an open position, the latches 19 are swung to overlap one jaw of each pair, after which the triggers 20 are tilted so that their noses 22 overlap the latches 19. After having set the trap in this manner, pressure upon the springs may be relieved and the trap anchored in any suitable manner by the anchoring chain 26 being connected to one of the springs and to some stationary object.

Bait having been placed upon the platforms 23 of the triggers, and an animal endeavoring to consume it from either trigger, will cause the latter to tilt thereby disengaging the trigger from its respective latch whereupon the freed pair of jaws will immediately close. The tilting of the first trigger tensions the spring 24 and consequently when pressure is relieved from the actuated trigger, the spring will recoil and permit the nose of the coacting trigger to disengage its coacting latch 19. The latch 19 being released, the springs 12 and 13 will immediately cause the remaining pair of jaws to snap closed and catch some other part of the animal's body not trapped by the closure of the first pair of jaws. As the two pairs of jaws will close in quick succession, should one pair of jaws fail to catch a part of the animal's body, then the other pair is bound to trap the animal, thereby a trap is provided which will make a sure catch in most cases.

The foregoing description and accompanying drawings have reference to what might be considered to be the approved or preferred form of my invention. I desire it to be understood that I may make such changes in the construction, combination and arrangement of parts, materials, dimensions, etc., as may prove expedient and fall within the scope of the appended claims.

Having thus described my invention what I claim as new and desire to secure by Letters Patent is:

1. A trap comprising a plurality of pairs of jaws, spring means for closing the jaws, latch means for each pair of jaws, and means connecting said latch means whereby movement of one latch means operates the other latch means.

2. A trap comprising a plurality of pairs of jaws, spring means for closing the jaws, latches for retaining the pairs of jaws in a set position, a trigger for each latch, and means connecting the triggers whereby the pairs of jaws will be caused to close in quick succession.

3. A trap comprising a plurality of pairs of jaws, spring means to close the jaws, a latch for retaining each pair of jaws in a set position, a trigger for each latch, and a coiled spring connecting the triggers whereby the pairs of jaws will be caused to close in quick succession.

4. A trap comprising a plurality of pairs of jaws, each pair of jaws being arranged beyond the confines of all the other pairs of jaws, latch means for retaining all the pairs of jaws open, and a single spring engaging all pairs of jaws for causing the same to close in quick succession.

5. A trap comprising a plurality of pairs of jaws, latch means for retaining the pairs of jaws open, and a spring doubled upon itself and having a pair of apertured arms associated with each pair of jaws.

6. A trap comprising a plate, a pair of jaws pivoted at each end of said plate, a spring folded upon itself to provide a pair of heads, each head being provided with a pair of apertured arms, corresponding arms being associated with the pairs of jaws and means for retaining the jaws in an open position.

In testimony whereof I affix my signature in presence of two witnesses.

JOHN F. ARNETH.

Witnesses:
LOUIS W. HELMUTH,
RUDOLPH T. HARRELL.